United States Patent [19]

Boots

[11] Patent Number: 4,601,512
[45] Date of Patent: Jul. 22, 1986

[54] OPEN ROOF-CONSTRUCTION FOR A VEHICLE

[75] Inventor: Robert T. Boots, Haarlem, Netherlands

[73] Assignee: Vermeulen-Hollandia Octrooien II B.V., Netherlands

[21] Appl. No.: 598,570

[22] Filed: Apr. 10, 1984

[30] Foreign Application Priority Data

May 6, 1983 [NL] Netherlands .................. 8301608

[51] Int. Cl.$^4$ .................................................. B60J 7/00
[52] U.S. Cl. ..................................... 296/221; 296/222; 296/223
[58] Field of Search ................ 296/216, 217, 221–223

[56] References Cited

U.S. PATENT DOCUMENTS

4,420,184 12/1983 Kaltz .................................. 296/221

FOREIGN PATENT DOCUMENTS

0093620 6/1983 Japan .................................. 296/221
2090565 7/1982 United Kingdom ................ 296/222

*Primary Examiner*—Robert B. Reeves
*Assistant Examiner*—Dennis H. Pedder
*Attorney, Agent, or Firm*—Kane, Dalsimer, Kane, Sullivan and Kurucz

[57] ABSTRACT

The invention relates to an open roof-construction for a vehicle having a roof opening, comprising a panel, which is movable from the closed position in the roof opening to a rearwardly and downwardly inclined position, from which the panel is displaceable to a completely or partially opened position under the fixed roof, whereafter the panel may be returned again to the closed position, while furthermore the panel can be moved from the closed position to a rearwardly and upwardly inclined ventilation position and from this ventilation position can be moved back again to the closed position, while for displacing the panel a pull-push means on at least one side engages a slide plate which is guided in a stationary, substantially horizontal rail, the panel being displaceably supported near its front side, while the panel and the slide plate are connected with each other at a distance from the front side of the panel by a relatively pivotally moveable two leg link connection means having a guide pin on one leg, which engages a guide slot in the slide plate and an oppositely facing guide peg on the other leg which engages a stationary guide slot, said connection means being pivotably connected to the panel by means of a transversely extending pivot shaft.

15 Claims, 9 Drawing Figures

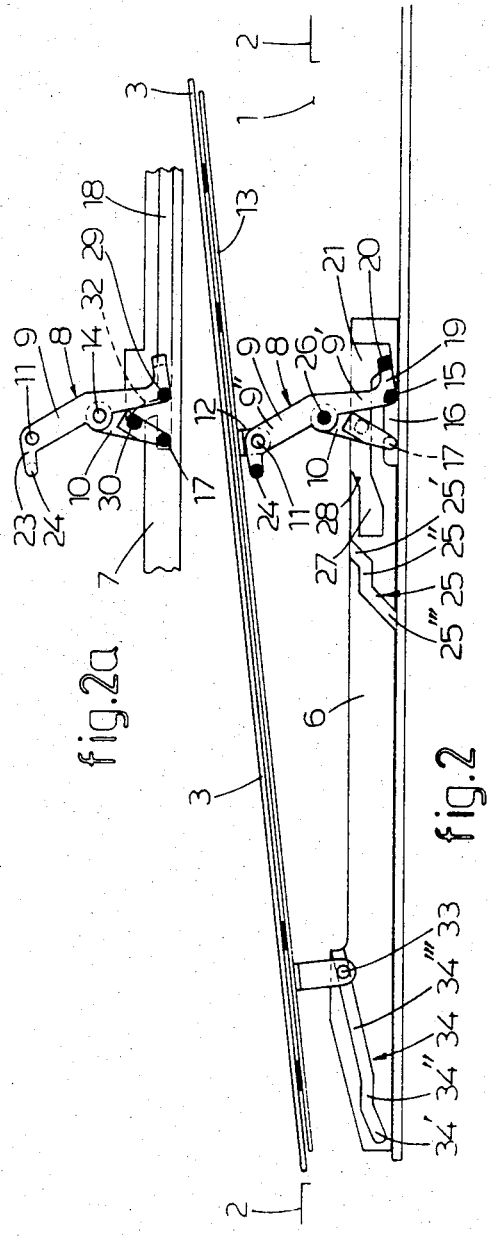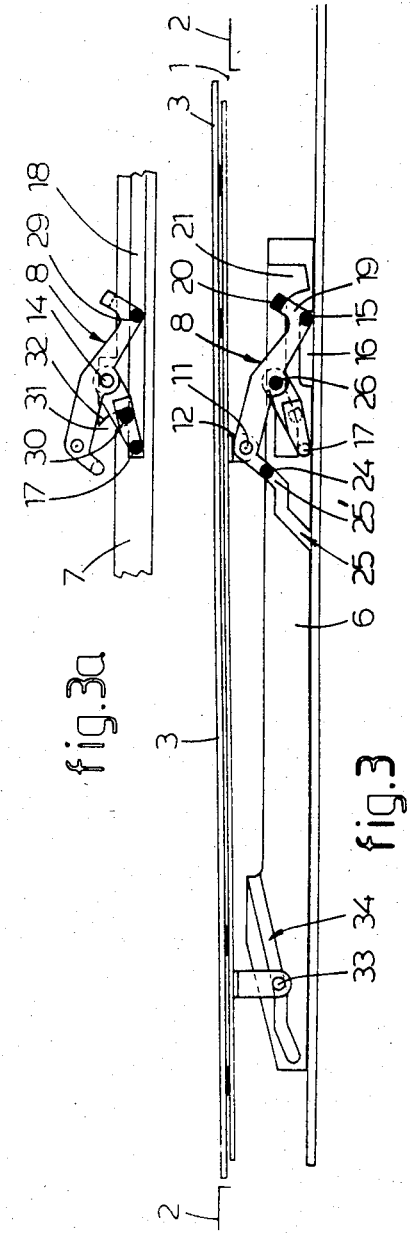

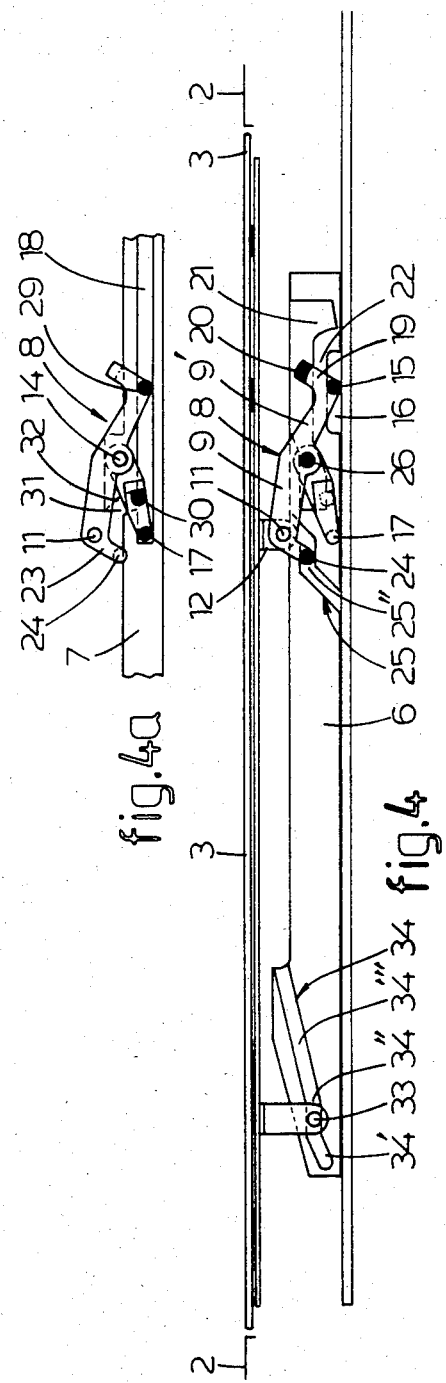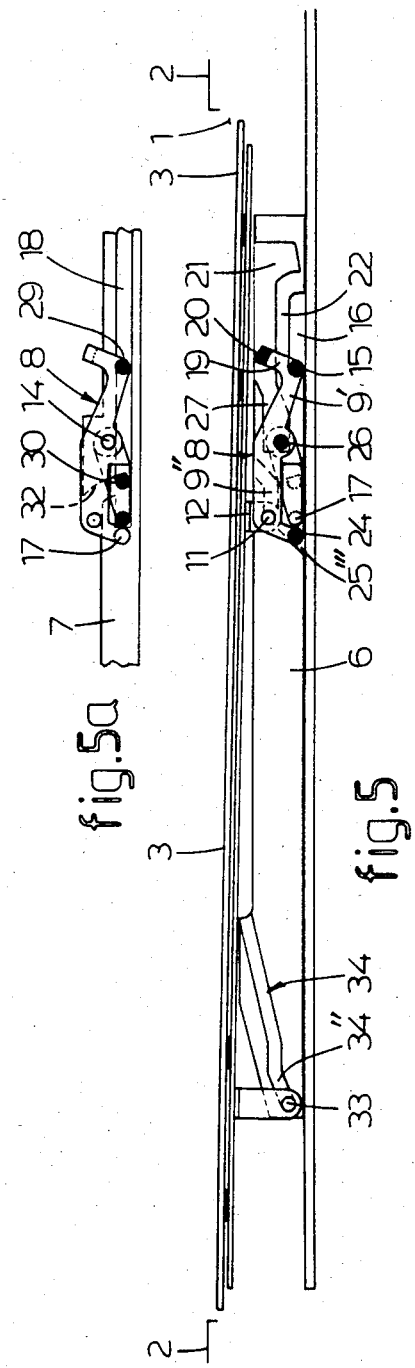

OPEN ROOF-CONSTRUCTION FOR A VEHICLE

The invention relates to an open roof-construction for a vehicle having a roof opening, comprising a panel, which is movable from the closed position in the roof opening to a rearwardly and downwardly inclined position, from which the panel is displaceable to a completely or partially opened position under the fixed roof, whereafter the panel may be returned again to the closed position, whilst furthermore the panel can be moved from the closed position to a rearwardly and upwardly inclined ventilation position and from this ventilation position can be moved back again to the closed position, while for displacing the panel a pull-push means on at least one side engages a slide plate which is guided in a stationary, substantially horizontal rail, the panel being displaceably supported near its front side, whilst the panel and the slide plate are connected with each other at a distance from the front side of the panel by a connection means having a guide pin, which engages a guide slot in the slide plate, said connection means being pivotably connected to the panel by means of a transversely extending pivot shaft.

Herein the term "ventilation position" denotes the position in which the rear edge of the panel is raised at a maximum. Obviously, the panel can assume intermediate positions between the closed position and this ventilation position as well.

The invention has the object of providing a very simple embodiment of such open roof-construction, wherein the total height in the vehicle, which, of course, determines the internal height of the vehicle, is minimized.

For this purpose the open roof-construction according to the invention is characterized in that the connection means comprises a link means having two legs, the upper part of one leg thereof pivotably engaging the panel by means of the said pivot shaft and the upper end of the second leg thereof being pivotably connected to the one leg intermediate the ends of this one leg by means of a second transversely extending pivot shaft, while both legs near their lower parts engage the guide slot in the slide plate and/or a horizontal longitudinal slot in a stationary guide, the leg portion disposed between the lower part of the one leg and the second pivot shaft enclosing an angle with the second leg, said angle being at its maximum in the rearwardly and downwardly inclined position of the panel and at its minimum in the ventilation position of the panel.

The embodiment of the connection means as a link means results in that on the one hand a sufficiently raised height of the rear edge of the panel in the ventilation position can be reached in an extremely simple manner, while on the other hand the required total height is minimized.

Advantageously, the guide pin is attached to the lower part of the one leg of the link means, while the guide slot extends horizontally.

In the ventilation position of the panel the guide pin may engage the rear end of the guide slot, while in the rearwardly and downwardly inclined position of the panel the guide pin abuts the front end of the guide slot.

The lower part of the one leg may lie further rearwardly than the lower part of the second leg.

In an advantageous embodiment of the open roof-construction of the invention the second leg of the link means carries a guide peg at its free lower end, which guide peg extends from the second leg in a direction opposite to the direction in which the guide pin extends from the one leg, said guide peg being received in the horizontal longitudinal slot in the stationary guide, in the ventilation position of the panel this guide peg being in contact with the front wall of the longitudinal slot in the stationary guide, said guide peg remaining in contact with this front wall of this longitudinal slot until the panel has arrived to its the rearwardly and downwardly inclined position and is moved rearwardly, which rearward movement is followed by the guide peg in the longitudinal slot in the stationary guide.

The one leg of the link means may be provided with a protrusion which in the ventilation position of the panel is disposed at the lower side and the rear side and which lies at the same side of the one leg as the guide pin and in the ventilation position of the panel extends in a recess in the slide plate disposed behind the guide slot and engages a curved front wall of this recess, while, when the panel is moved to the closed position, said protrusion leaves this recess to be positioned above the upper wall of the guide slot.

Any undesired vertical displacements of the panel can be effectively prevented in the respective positions of the panel by the confinement, which the guide pin and the protrusion together can effect on the intermediate upper wall of the guide slot.

In the ventilation position of the panel the protrusion may engage the bottom wall of the recess.

In this manner the protrusion also functions as an abutment, which determines the maximum raising height of the rear edge of the panel in the ventilation position.

The invention will be explained hereinafter with reference to the drawings, which very schematically represent an embodiment of an open roof-construction according to the invention.

FIGS. 2 and 2a show a schematic side view of a portion of the open roof-construction of FIG. 1 in the ventilation position of the panel, this view for reasons of clarity separately showing the side of the stationary guide which faces the slide plate, the stationary guide lying in front of the slide plate.

FIGS. 3 and 3a show a schematic side view similar to FIG. 2 and represents the open roof-construction of FIG. 2 in the position at which the closed position is nearly reached.

Figure 1:
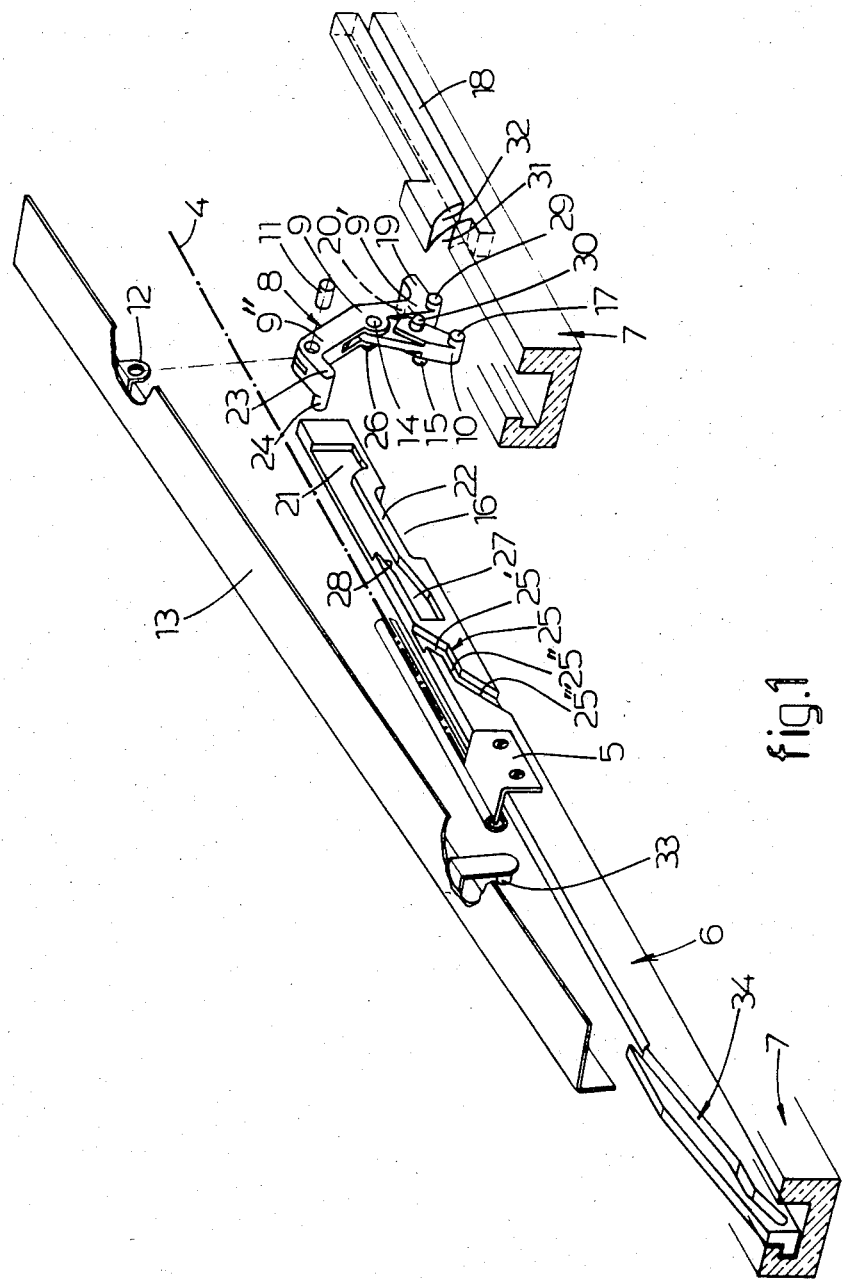
FIG. 1 is a schematic perspective view of a portion of an embodiment of the open roof-construction according to the invention, wherein various parts have been illustrated separated from each other.

FIGS. 4 and 4a show a schematic side view similar to FIGS. 2 and 3 and represents the open roof-construction of FIGS. 2 and 3 in the closed position.

FIGS. 5 and 5a show a schematic side view similar to FIGS. 2, 3 and 4 and represents the open roof-construction of FIGS. 2, 3 and 4 in the position in which the panel is inclined rearwardly and downwardly.

The drawing represents by way of example an embodiment of an open roof-construction for a vehicle that has been provided with an opening 1 in the fixed roof 2.

This open roof-construction comprises a panel 3 that can be moved from the closed position in the roof opening 1 (FIG. 4) to a rearwardly and downwardly inclined position (FIG. 5), from which the panel 3 can be displaced rearwardly underneath the fixed roof 2 to a completely or partially opened position and thereupon can be moved back from this position to the closed position.

Furthermore, the panel 3 can be moved from the closed position to a rearwardly and upwardly inclined ventilation position (FIG. 2) and thereafter can be moved back from this ventilation position to the closed position.

For displacing the panel 3 a cable-like pull-push means 4 has been provided at least at one side, but in general at both sides of the open roof-construction, which pull-push means can be displaced by an actuating member (not illustrated) in the longitudinal direction of the vehicle and engages a bracket 5 on a slide plate 6 that is guided in a substantially horizontal guide 7 mounted in the vehicle.

In general, at either side of the vehicle such stationary substantially horizontal guide 7 has been arranged, each guide guiding a slide plate 6 disposed at the respective side of the vehicle, while each slide plate 6 can be moved by its own cable-like pull-push means 4 in its stationary guide 7 and both pull-push means 4 can be commonly displaced.

In the embodiment represented in the drawing only the slide plate 6 disposed at one side of the vehicle and the stationary guide 7 as well as the link means 8 cooperating therewith and hereinafter further described have been shown, it being understood that in general at the other side of the vehicle similar members have been used, which constitute the mirror image of the elements represented in the drawing.

The panel 3 is displaceably supported near the front side in a manner to be described hereinafter.

At a distance behind the front side of the panel 3 the panel 3 and the slide plate 6 are connected with each other by a connection means embodying the already mentioned link means 8 having two legs 9, 10.

The upper part of the one leg 9 of this link means 8 is pivotably connected by means of a transversely extending pivot shaft 11 to a bracket 12 at the lower side of an angle section 13 mounted underneath the panel 3.

The upper end of the second leg 10 is pivotably connected with the leg 9 between the ends of the leg 9, by means of a second transversely extending pivot shaft 14.

A guide pin 15 is attached to the lower part of the leg 9 of the link means 8 and engages a horizontal guide slot 16 in the slide plate 6.

As appears from a comparison of FIGS. 2 and 5, in the ventilation position of the panel 3 the guide pin 15 engages the rear end of the guide slot 16, while in the rearwardly and downwardly inclined position of the panel 3 the guide pin 15 abuts the front end of the guide slot 16.

The lower part of the leg 9 lies further rearwardly than the lower part of the leg 10.

The leg portion 9' lying between the lower part of the leg 9 and the second pivot shaft 14 encloses an angle with the leg 10, which angle is at its maximum in the rearwardly and downwardly inclined position of the panel 3 (FIG. 5) and at its minimum in the ventilation position of the panel 3 (FIG. 2).

The leg 10 of the link means 8 carries a guide peg 17 at its free lower end, which guide peg extends from the leg 10 in a direction opposite to the direction in which the guide pin 15 extends from the leg 9.

The guide peg 17 is received in a horizontal longitudinal slot 18 in the stationary guide 7 and in the ventilation position of the panel 3 this guide peg is in contact with the front wall and the upper wall of this longitudinal slot 18 in the stationary guide 7.

The guide peg 17 remains in engagement with this front wall and upper wall of the longtudinal slot 18 in the stationary guide 7 until the panel 3 has arrived in the rearwardly and downwardly inclined position and is moved rearwardly under the fixed roof 2 in order to bring the panel 3 in the completely or partially opened position. This rearward movement of the panel 3 is followed by the guide peg 17 in the longitudinal slot 18 in the stationary guide 7.

Furthermore, the lower part of the leg 9 of the link means 8 carries a lip 19 which is directed rearwardly in the ventilation position of the panel 3. This lip 19 is provided with a protrusion 20 which lies at the same side of the leg 9 as the guide pin 15 and in the ventilation position of the panel extends in a recess 21 in the slide plate 6 disposed behind the guide slot 16.

The protrusion 20 has a curved front wall which engages a correspondingly curved front wall of the recess 21.

In the ventilation position of the panel 3 the protrusion 20 engages the bottom wall of the recess 21 (FIG. 2) and in this position forms an abutment which determines the maximum raising height of the rear edge of the panel 3.

When the panel 3 is moved from the ventilation position to the closed position by a rearward movement of the slide plate 6 the protrusion 20 leaves the recess 21, shortly before this closed position is reached and this protrusion 20 will come to lie above the upper wall 22 of the guide slot 16, so that the guide pin 15 can leave its rearmost position in the guide slot 16.

When the slide plate 6 is moved rearwardly, the protrusion 20 together with the guide pin 15 effects the downward pivotal movement of the leg 9 from its position in the ventilation position of the panel 3 until the closed position has nearly been reached and the guide pin 15 can leave its rearmost position in the guide slot 16.

Furthermore, the protrusion 20 together with the guide pin 15 and the upper wall 22 of the guide slot 16 serves to prevent accidental rising movements of the panel 3.

The upper part of the leg 9 of the link means 8 carries a lip 23 which is directed forwardly in the ventilation position of the panel 3.

This lip 23 is provided with a transverse pin 24, which lies at the same side of the leg 9 as the guide pin 15.

The slide plate 6 has a stepped slot 25, which lies in front of the guide slot 16 and includes a forwardly and downwardly inclined rear part 25' having an open upper and rear end, a substantially horizontal part 25" joining the front side thereof, and a forwardly and downwardly inclined front part 25''' joining the front side of the horizontal part.

In the ventilation position of the panel 3 the transverse pin 24 is completely clear of this stepped slot 25 and only enters this slot 25 at the upper side, when the panel 3 has nearly reached the closed position (FIG. 3).

In the closed position of the panel 3 the transverse pin 24 extends in the substantially horizontal part 25" of this stepped slot 25, while in the rearwardly and downwardly inclined position of the panel 3 the transverse pen 24 assumes the lowermost position in the forwardly and downwardly inclined front part 25''' of the stepped slot 25 (FIG. 5).

When the slide plate 6 is moved rearwardly from the position of FIG. 3, the rear slot part 25' together with the transverse pin 24 effects the further part of the downward pivoting movement of the leg 9 to its position in FIG. 5 subsequently to the downward pivoting movement of this leg 9 from the position of FIG. 2 to the position of FIG. 3 as effected by the protrusion 20 and the guide pin 15 as has already been explained hereinbefore.

The transverse pin 24 furthermore serves for effecting the first part of the upward pivoting movement of the leg 9 of the link means 8 from its lowermost position, in which the panel 3 assumes the rearwardly and downwardly inclined position (FIG. 5).

During this first part of the upward pivoting movement of the leg 9, which is effected by a forward movement of the slide plate 6, the transverse pin 24 traverses the stepped slot 25, while the guide pin 15 traverses the guide slot 16 in the slide plate 6.

After the guide pin 15 on the leg 9 of the link means 8 has engaged the rear end of the guide slot 16, the further upward pivoting movement of the leg 9 takes place by the engagement of the guide pin 15 with this rear end of the guide slot 16.

The link means 8 is provided with a further transverse pin 26 at the pivoting connection of the legs 9, 10, which further transverse pin lies on the same side of the leg 9 as the guide pin 15. This further transverse pin 26 cooperates with a recess 27 which is formed in the slide plate 6 in front of the guide slot 16 and behind the stepped slot 25 and which is open at the rear side. This further transverse pin 26 enters this recess 27, when the panel 3 has nearly reached the closed position.

When the panel 3 is further pivoted to the closed position by the rearward movement of the slide plate 6 this further transverse pin 26 travels along the lower side of a forwardly and downwardly inclined upper inlet surface 28 of this recess 27.

The cooperation between the further transverse pin 26 and the inlet surface 28 further insures that upon rearward movement of the slide plate 6 the transverse pin 24 enters the forwardly and downwardly inclined rear part 25' of the stepped slot 25 indeed and takes over the action of the guide pin 15 in respect of the downward pivoting movement of the leg 9 of the link means 8 when the guide pin 15 is going to traverse the guide slot 16.

In the embodiment represented in the drawings the further transverse pin 26 is an extension of the pivot shaft 14 which effects the pivoting connection between both legs 9, 10 of the link means 8.

The leg 9 of the link means 8 carries a further guide pin 29 at its lower part, at the location where the leg 9 adjoins the lip 19, which further guide pin 29 extends in the direction opposite to that of the guide pin 15 and is aligned with this guide pin 15.

This further guide pin 29 is received in the horizontal longitudinal slot 18 in the stationary guide 7 and engages the upper wall of this longitudinal slot 18 rearwardly of the guide peg 17.

The additional guidance effected by this further guide pin 29 enhances an easy displacement of the panel 3.

The leg 10 furthermore carries a locking cam 30, which is positioned between the pivot shaft 14 between both legs 9, 10 of the link means 8 and the guide peg 17 at the same side of the leg 10 as the guide peg 17.

The longitudinal slot 18 in the stationary guide 7 has an upper inlet opening 31 at some distance from its front side, which inlet opening is defined at the rear side by an upwardly projecting, curved, downwardly and rearwardly extending edge part 32.

In the ventilation position of the panel 3 the locking cam 30 on the leg 10 engages the upper portion of this curved edge part 32, while the locking cam 30 is moved downwardly along this curved edge part 32, when the panel 3 is pivoted downwardly to the closed position.

In the closed position of the panel 3 the locking cam 30 still engages the lower portion of this curved edge part 32.

Only in the rearwardly and downwardly inclined position of the panel 3 which precedes the movement of the panel 3 to the completely or partially opened position, the locking cam 30 is fully lowered in the longitudinal slot 18 in the stationary guide 7 and the rearward movement of the panel 3 can be followed by the locking cam 30 in this longitudinal slot 18. The locking cam 30 thus prevents a rearward movement of the panel 3 before it has reached the position of FIG. 5.

The angle section 13 underneath the panel 3 carries a transversely extending pivot pin 33 near its front side, which pivot pin 33 engages a front slot 34 in the slide plate 6.

This front slot 34 comprises a rearwardly and upwardly inclined front part 34', a substantially horizontal part 34" joining the rear side thereof, and a rearwardly and upwardly inclined rear part 34''' joining the rear side of the horizontal part 14".

In the closed position of the panel 3 the pivot pin 33 engages the substantially horizontal part 34" of the front slot 34.

When the slide plate 6 is moved rearwardly in order to pivot the panel 3 from the closed position to the rearwardly and downwardly inclined position, the pivot pin 33 traverses the front part 34' of this front slot 34.

When the panel 3 is pivoted from the closed position to the ventilation position by a forward movement of the slide plate 6, the pivot pin 33 traverses the rear part 34''' of this front slot 34 and prevents the front edge of the panel 3 from being moved downwardly or forwardly during this pivoting movement.

This is effective to prevent damage of a sealing member disposed at the front side of the panel 3 and/or along the adjacent edge of the opening 1 in the fixed roof 2, when the panel 3 is pivoted from the closed position to the ventilation position.

To enable easy mounting and dismounting of the panel 3 the front slot 34 is open at its rear side, while the pivot shaft 11 connecting the upper part of the leg 9 of the link means 8 to the bracket 12 of the angle section 13 underneath the panel 3, is releasable.

In the rearwardly and downwardly inclined position of the panel 3 (FIG. 5) the part 9" of the leg 9 lying above the pivoting connection of both legs 9, 10 of the link means 8, and the leg 10 bear on each other, while extending substantially horizontally, so that the space occupied in this position is minimized. In this position of the legs 9, 10 the part 9' of the leg 9 extends in the rearwardly and downwardly inclined direction at a small angle with the horizontal.

In the embodiment represented in the drawing the stationary guide 7 not only serves to guide the panel 3 by means of the longitudinal slot 18 formed therein, but this stationary guide 7 also serves to guide the slide plate 6. Obviously, it is also possible to guide this slide plate 6 by means of a separate, substantially horizontal stationary rail.

The legs 9, 10 of the link means 8 have the same thickness, and, as may be seen particularly in FIG. 1, the leg 10 is locally reduced in thickness near the pivot shaft 14 so as to enable relative pivoting movement of the legs 9, 10.

The invention provides an open roof-construction for a vehicle, which has a particularly small total height. Furthermore, the guidance of the panel 3 by the cooperating link means 8, slide plates 6 and stationary guides 7 is very stable so that the panel 3 is always prevented from rattling in an effective manner in intermediate positions as well.

The invention is not limited to the embodiment represented in the drawing by way of example, which may be varied within the scope of the invention in various ways.

I claim:

1. An open roof construction for a vehicle having a roof opening comprising:
    a panel for closing said roof opening and having a front side, said panel having a closed position, and being movable from said closed position to a rearwardly and downwardly inclined position, and from said inclined position to an at least partially opened position under a fixed roof, said panel being returnable from said opened position to said closed position while furthermore the panel can be moved from the closed position to a rearwardly and upwardly inclined ventilation position and from this ventilation position can be moved back again to the closed position;
    a stationary, substantially horizontal rail with a longitudinal horizontal guide slot with a guide front end;
    a slide-plate movably engaged by said horizontal rail, and having a horizontal guide slot;
    a first transversally extending pivot shaft disposed at a preselected distance from said panel front end for displaceable supporting said panel;
    a slide-plate connection means for interconnecting said slide plate and said panel, said slide-plate connection means having a link means with two legs, one of said legs having an upper part pivotably engaging said first shaft; a lower part carrying a guide pin which engages said guide slot in said slide plate, said guide slot having a rear end engaged by said guide pin when said panel is in the ventilation position and a front end which is abutted by said guide pin when said panel is in said rearwardly and downwardly inclined position; a second transverse pivot shaft for pivotably connecting the other leg of said link means to the one leg at a position intermediate between said upper and lower parts;
    said second leg having a lower part carrying a guide peg extending in a direction facing away from said slide-plate, said guide peg being engaged by said stationary guide slot, said guide peg remaining in contact with said guide front end while said panel is moved from the closed to said rearwardly and downwardly inclined position, said guide peg moving rearwardly in said guide slot while said panel is moved rearwardly from said inclined position, wherein a lower part of said one leg is disposed rearwardly from the lower part of the other leg, a portion of said one leg between said leg lower part and said second shaft forming an angle with said other leg which is at a maximum in the rearwardly and downwardly position of the panel and which is at a minimum in the ventilation position of the panel; and
    a pull-push means engaging said slide plate for moving said panel.

2. Open roof-construction as claimed in claim 1, wherein the one leg of the link means is provided with a protrusion which in the ventilation position of the panel is disposed rearward of said guide pin and which lies at the same side of the one leg as the guide pin and in the ventilation position of the panel extends in a recess in the slide plate disposed behind the guide slot and engages a curved front wall of this recess, while, when the panel is moved to the closed position, said protrusion leaves this recess to be positioned above an upper wall of the guide slot.

3. Open roof-construction as claimed in claim 2, wherein in the ventilation position of the panel the protrusion engages a bottom wall of the recess.

4. Open roof-construction as claimed in claim 1, wherein the one leg of the link means is provided with a transverse pin which in the ventilation position of the panel is disposed at the upper part forward of said pivot shaft and which lies at the same side of the one leg as the guide pin, while the slide plate has a slot which cooperates with this transverse pin and which lies in front of the guide slot, which slot is at least partially inclined forwardly and downwardly, whilst in the ventilation position of the panel the transverse pin is completely free from this slot and enters this slot at an upper side when the panel has nearly reached the closed position.

5. Open roof-construction as claimed in claim 4, wherein the slot in the slide plate which cooperates with the transverse pin has a stepped configuration and comprises a forwardly and downwardly inclined rear part having an open upper and rear end, a substantially horizontal part joining the front side thereof, and a forwardly and downwardly inclined front part joining a front side of said horizontal part, in the closed position of the panel this transverse pin extending in the substantially horizontal part of this stepped slot and in the rearwardly and downwardly inclined position of the panel this transverse pin assuming a lowermost position in the forwardly and downwardly inclined front part of the stepped slot.

6. Open roof-construction as claimed in claim 5, wherein the link means is provided with a further transverse pin at the pivoting connection of the legs, which further transverse pin is disposed at the same side of the one leg as the guide pin and cooperates with a recess which is formed in the slide plate in front of the guide slot and behind the stepped slot and which is open at a rear side, this further transverse pin entering this recess when the panel has nearly reached the closed position, and subsequently travelling along a lower side of a forwardly and downwardly inclined surface when the panel is moved to the closed position.

7. Open roof-construction as claimed in claim 6, wherein the further transverse pin is an extension of the second pivot shaft effecting the pivoting connection between both legs of the link means.

8. Open roof-construction as claimed in claim 1, wherein the one leg of the link means carries a further guide pin at its lower part, which further guide pin extends in a direction opposite to that of said first mentioned guide pin and is received in the horizontal longitudinal slot in the stationary guide, whilst this further guide pin engages this longitudinal slot rearwardly of said guide peg.

9. Open roof-construction as claimed in claim 8, wherein the guide pin and the further guide pin are aligned with each other.

10. Open roof-construction as claimed in claim 1, wherein the second leg carries a locking cam which lies between the second pivot shaft and the guide peg at the same side of the second leg as the guide peg, while the longitudinal slot in the stationary guide has an upper inlet at a distance from the front guide end, which inlet is defined at the rear side by a curved, downwardly and rearwardly extending edge part, in the ventilation position of the panel a locking cam engaging the upper portion of this curved edge part, the locking cam being moved downwardly along this edge part, when the panel is pivoted downwardly to the closed position, while in this closed position of the panel the locking cam still engages a lower portion of this curved edge part, and in the rearwardly and downwardly inclined position of the panel the locking cam is completely received in the longitudinal slot in the stationary guide.

11. Open roof-construction as claimed in claim 1, wherein the panel carries a transversely extending pivot pin near its front side, which pivot pin engages a front slot in the slide plate, said front slot being at least partially rearwardly and upwardly inclined.

12. Open roof-construction as claimed in claim 11, wherein the front slot comprises a rearwardly and upwardly inclined front part, a substantially horizontal part joining the rear side thereof and a rearwardly and upwardly inclined rear part joining the rear side of said horizontal part, in the closed position of the panel the pivot pin engaging the substantially horizontal part of the front slot, while the pivot pin traverses the front part of this front slot when the panel is moved from the closed position to the rearwardly and downwardly inclined position, the pivot pin moving through the rear part of this front slot when the panel is moved from the closed position to the ventilation position.

13. Open roof-construction as claimed in claim 12, wherein this front slot is open at its rear side, while the pivot shaft connecting the upper part of the one leg of the link means with the panel is releasable.

14. Open roof-construction as claimed in claim 1, wherein in the rearwardly and downwardly inclined position of the panel a part of the one leg lying above the pivoting connection of both legs of the link means, and the second leg extend substantially horizontally and bear upon each other, while the other part of the one leg extends rearwardly and downwardly at a small angle with the horizontal.

15. Open roof-construction as claimed in claim 1, wherein both legs have the same thickness, while the second leg is locally reduced in thickness near the second pivot shaft.

* * * * *